(12) United States Patent
Zebic et al.

(10) Patent No.: US 8,219,022 B2
(45) Date of Patent: Jul. 10, 2012

(54) COMMUNICATION METHOD, COMMUNICATION SYSTEM AND COMMUNICATION DEVICE

(75) Inventors: Gregor Zebic, Trzin (SI); Gregor Garbajs, Ljubljana (SI)

(73) Assignee: Gregor Zebic, Trzin (SI)

( * ) Notice: Subject to any disclaimer, the term of this patent is extended or adjusted under 35 U.S.C. 154(b) by 630 days.

(21) Appl. No.: 12/126,680

(22) Filed: May 23, 2008

(65) Prior Publication Data

US 2008/0280562 A1 Nov. 13, 2008

Related U.S. Application Data

(63) Continuation of application No. PCT/EP2005/012633, filed on Nov. 11, 2005.

(51) Int. Cl.
*H04H 40/00* (2008.01)

(52) U.S. Cl. ....... 455/3.06; 455/3.03; 455/410; 370/254

(58) Field of Classification Search ............... 455/3.06, 455/3.03, 410, 404.1, 414.1, 41.2; 370/254; 709/228

See application file for complete search history.

(56) References Cited

U.S. PATENT DOCUMENTS

| | | | |
|---|---|---|---|
| 5,572,528 A | 11/1996 | Shuen et al. | |
| 6,301,567 B1 * | 10/2001 | Leong et al. | 705/33 |
| 6,353,734 B1 | 3/2002 | Wright et al. | |
| 6,640,239 B1 | 10/2003 | Gidwani | |
| 6,772,196 B1 * | 8/2004 | Kirsch et al. | 709/206 |
| 6,920,557 B2 * | 7/2005 | Coffy et al. | 713/159 |
| 6,932,298 B1 * | 8/2005 | Mills | 244/118.5 |
| 6,996,621 B1 * | 2/2006 | Borella et al. | 709/228 |
| 7,185,360 B1 * | 2/2007 | Anton et al. | 726/3 |
| 7,321,437 B2 * | 1/2008 | Parry | 358/1.15 |
| 7,567,522 B2 * | 7/2009 | Borowski | 370/254 |
| 2002/0078198 A1 * | 6/2002 | Buchbinder et al. | 709/224 |
| 2003/0063309 A1 * | 4/2003 | Parry | 358/1.15 |
| 2004/0105122 A1 * | 6/2004 | Schaeffer | 358/1.15 |
| 2005/0198205 A1 * | 9/2005 | Roach | 709/219 |
| 2005/0234912 A1 * | 10/2005 | Roach | 707/9 |
| 2006/0190566 A1 * | 8/2006 | Roach | 709/219 |
| 2007/0214262 A1 * | 9/2007 | Buchbinder et al. | 709/224 |
| 2008/0092069 A1 * | 4/2008 | Chan et al. | 715/763 |
| 2009/0007227 A1 * | 1/2009 | Burgess et al. | 726/1 |

OTHER PUBLICATIONS

International Search Report dated Apr. 7, 2006.

* cited by examiner

*Primary Examiner* — Minh D Dao

(74) *Attorney, Agent, or Firm* — Gottlieb, Rackman & Reisman, P.C.

(57) ABSTRACT

The present invention relates to a data communication method, a data communication system and a communication device. In particular, the present invention relates to a wireless communication device, wherein a broadband internet connection between said communication device and a data network is used. Said broadband internet connection has a high security between said wireless communication device and a data network by the usage of a unique port secured access by means of public known keys.

74 Claims, 4 Drawing Sheets

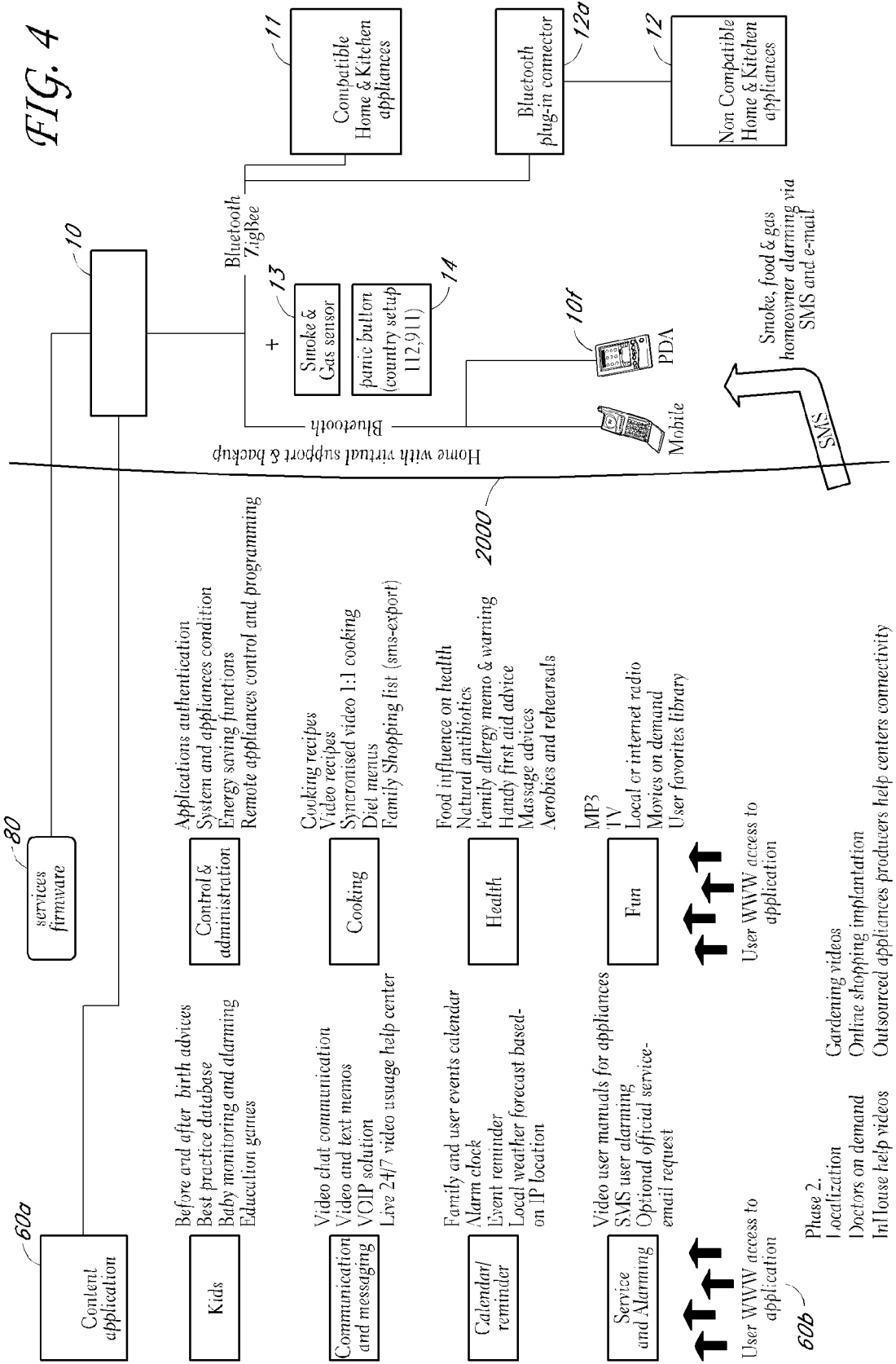

COMMUNICATION METHOD, COMMUNICATION SYSTEM AND COMMUNICATION DEVICE

RELATED APPLICATIONS

This application is a continuation of PCT/EP2005/012633, filed Nov. 11, 2005, which was published in English and designated the U.S., and is incorporated herein by reference.

BACKGROUND OF THE INVENTION

1. Field of the Invention

The present invention relates to a communication method, wherein a user communicates via a communication device at his location with a pre-selected host server only, which provides the user with all services asked for and routes the user to other servers upon demand. In particular, the present invention relates to a communication system, which comprises a communication device, a transmitter box, at least one pre-selected host server to which the transmitter box has access and establishes a unique port secured access thereto and wherein the host server has an access to other system servers.

2. Description of the Related Technology

Our daily life is facilitated by means of electronic devices and computers, which enable a broad access to a variety of different information, especially via the internet. Different computer programs are available for communication with and surfing in the internet, all of which require a more or less detailed knowledge of the commands, by which the computer program is executed and allowing access to the information. However, most of the people using the internet dislike being confronted with different computer programs which merely serve for the same purpose, but require knowledge of the particularities of the program.

Another problem users have to face when surfing in the internet resides in that the user is confronted with third parties trying to get access to the user's computer and the data contained thereon or viruses/worms released by individuals into the internet simply for creating trouble. Even though computer programs are available serving as firewalls and anti-Virus shields preventing infection of the personal computer by the viruses/worms, these computer programs require a cyclical up-date, which the user has to take care to carry out before continuing to surf in the internet. A great concern is especially the communication of a user with an external partner, e.g. the bank, which is sometimes jeopardized by intruders.

For communication via the internet personal computers are used. These computers harbour apart from computer programs for the communication also computer programs for writing, calculation, media processing etc. Since computer programs are further developed, improved and equipped with more and more functions, also the capacity of the computers have to be further developed to cope with the enlarged demand for memory and processing capacity of the processor. Hence, once a personal computer has been purchased, optionally together with computer programs, both the computer and the programs will become outdated quite rapidly.

In view of the above shortcomings there is a need for an improved communication method and system, that obviates the above drawbacks.

SUMMARY OF THE INVENTION

An overall object of the present invention is to provide a data communication method, a data communication system and a communication device to provide a broadband internet connection between said communication device and a data network, which at the same time comprises external unique user database and data storage and provides security and contingency.

According to a first aspect the present invention provides a data communication method for operating a communication system, wherein said communication system comprises at least one communication device, which may communicate with its surroundings via a wire or wireless. At least one transmitter box, which may communicate with its surroundings via a wire or wireless, and at least one pre-selected host server, which is the only external server the communication device has a direct access to.

After starting said communication device by a user the following steps are executed. A communication is established between said communication device and said transmitter box, which itself establishes a connection with the pre-selected host server, either via a standing line or broadband internet. Said transmitter box may have a unique port secured access to said at least one pre-selected host server. The user may now receive data from said host server at said communication device, which are displayed on a display comprised by the communication device and/or which result in establishing a communication between said communication device and appliances at the location of the user.

The major advantages comprised by this kind of system resides in that the user works with one type of computer software only, provided by the provider of the pre-selected server, which computer program will allow the user to have access to all of the services requested, for example access to the internet, word processing program, table calculation etc. Hence knowledge about a variety of different browsers is not required any more. Further, since all of the relevant computer programs used nowadays, e.g. word processing, table calculation, presentation programs etc. will be provided on the said pre-selected server, there is no need anymore to purchase any of the latest computer programs for these purposes, or updates thereof. Also, since the communication device may be of simple structure, the user does not have to buy the latest and fastest personal computer which is capable to cope with the most recent computer program. However, for most of the users the safety of the system provided may be most prominent feature. The user does not have to worry about the latest update of his firewall or virus software to be on his personal computer. All of these technical issues are handled by the provider, running the pre-selected personal computer, to which the user has a unique and safe access, i.e. has a unique IP number there.

According to a further embodiment all or part of the communication between the different physical entities of the system, e.g. the communication device, the transmitter box and the pre-selected server, may be effected wireless, such as e.g., without limiting it thereto, by Bluetooth, ZigBee or WLAN.

The system may be linked to home or office appliances, so that a user may communicate with any of the home or office appliances at the same location or at a distant location. In the context of the present invention the term "home or office appliances" shall be understood in a wide sense and shall essentially designate any electrical device, which may be controlled, managed, maintained and monitored. Non limiting examples are e.g. a computer, a personal (home or office) PC, a printer, a scanner a facsimile device, a refrigerator, a furnace, a heating device, a TV-set, DVD, an audio set, a video set, a radio-set, an alarm device, a washing device, a dishwasher, a microwave device, a freezer, telephone, etc. It will be appreciated that communication between the communication device and the home or office appliances may be effected wireless. e.g. by Bluetooth, ZigBee or WLAN, which ensues that the respective home or office appliance has a device which renders it compatible to such type of communication, i.e. it contains a Bluetooth or ZigBee or WLAN interface module, which may be an plug-in interface module, which may according to another embodiment have its own rechargeable power unit for independence of power outages. This has the advantage that said wireless communication device intercepting data from Bluetooth plug-in interface module in case of appliance power outage (fridge, etc.).

For carrying out the method of the present invention the communication device 10 is executing the steps described below for building up an optionally wireless communication 100 between said communication device 10 and a transmitter box 20 and further for building up a connection 400 between said transmitter box 20 and the pre-selected host server 30.

The communication device 10 may be implemented simply by means of a user interface, comprising a display module for displaying transmitted and/or received data, e.g. a LCD, and an input module, such as e.g. a keyboard, which according to one embodiment may be incorporated in the display by way of a touch screen, e.g. an or a touch screen pad. Also optionally a memory module, such as e.g. a flash memory may be included.

The use of a touch-screen LCD pad on said wireless communication device has the advantage that data can easily be input in said communication device and that it is user-configurable. Said touch-screen LCD pad may be removable, which has the advantage that said communication device is user-configurable. According to another embodiment the communication device 10 may be implemented to transmit data wireless, e.g. by means of a Bluetooth or ZigBee.

The communication device may comprise a first port module, for communication with a transmitter box and a second port module, for a communication with at least one home or office appliance. Said first port or said second port module may be a Bluetooth or ZigBee module. This has the advantage that home or office appliances may easily be remotely managed, monitored and control led if they also comprise a corresponding module.

According to a further embodiment of the present invention, said communication device, in particular the display module may comprise implemented video/voice communication support, such as a webcam and or speaker(s) microphone(s), so that a pre-determined surrounding of said communication device may be controlled, monitored and so that a video/voice communication between data network users may be established.

According to an embodiment of the present invention, said communication device may comprise a sensor, such as an application for gas and smoke detection, a unique firmware and application, or a CPU, which has the advantage that said device is user-configurable. According to an embodiment of the present invention, said wireless communication device comprises a recharging station module.

According to a further embodiment of the present invention, said wireless communication device also can comprises a panic button, which allows an easy handling in case of an emergency.

Said optionally wireless communication device 10 may be able to establish an optionally wireless communication to a home or office appliance having an implemented wireless module. So that said communication device 10 may communicate with said home or office appliance and may obtain information about the operational status of the sad home or office appliance(s).

In a first step said communication device 10 is establishing an optionally wireless communication 100 between said communication device 10 and said transmitter box 20. For a wireless communication said wireless device 10 and said wireless transmitter box 20 comprise an integrated wireless module (802.1 Ig secured wireless connection).

In a further step said transmitter box 20 is establishing a connection with said pre-selected host-server 30, which may be effected via a standing line or a broadband internet connection, e.g. via an ISDN-card, a broadband modem 21 or a network-card. According to an embodiment said connection is established via a broadband modem, which has the advantage to allow an easy build up of a broadband internet connection and to achieve a high data transfer rate.

According to an embodiment of the present invention said connection at the location of the user with the communication line to the pre-selected server is established via WLAN, which gives the inherent advantage that the user may move its position within the range provided by the WLAN system at his location (e.g. within an accessible radius).

The transmitter box 20 has access to at least one of a pre-selected host-server 30 only, which access is secure and cannot be jeopardized by third parties. By using a unique port secured access to said pre-selected server (30) the communication system becomes secure by using public known keys, which are provided by a provider of said data network.

After having established connection/communication with the pre-selected server 30, the user may transmit/retrieve, i.e. exchange data with the pre-selected host server 30, which may be put into practice by means of speech data, optionally outputted by means of a speaker, text data, numeric data, video data, image data, audio data etc. Since the server will provide for all of the software and also for essentially all of the hardware components required, the communication device 10 does not need to contain components, a conventional personal computer normally harbors, but only those components that allow communication with the pre-selected server 30. On the pre-selected server 30 the provider will provide for all.

According to another embodiment of the present invention the communication device 10 has connection/communicates with home or office appliances as referred to above, which is may be wireless, so that the user has the possibility to manage, control and/or monitor any of the respective home or office appliances from anywhere within the radius of exchanging data with the transmitter box 20.

In case of a wireless communication with home or office appliances, these appliances require a device, rendering them "wireless compatible", which may be effected by including an interface, such as a Bluetooth- or ZigBee-interface module 10c, which may be implemented in a plug-in style.

In principle, the pre-selected server, to which the user has access only, will provide a number of services, such as e.g. representing the personal computer for the user and providing all of the hardware components required, e.g. the latest CPU, the latest graphic card, the latest memory devices etc., and providing the computer programs required for work or leisure, such as word processing, table calculation, and also memory space etc. in the latest up-dated form, so that a user, be it (in) a company or a private person, will eventually work on the pre-selected server with his/her communication device.

In case the pre-selected server cannot provide the services asked for by the user based on its own data base, he will retrieve said data from other servers in the internet. In this case, the pre-selected server serves as a firewall and virus-protection for the user, which has the communication device at his location only. Since the pre-selected server will be professionally managed, it will always be updated with the most recent computer programs for protection against not allowed invasion by third parties.

According to an embodiment of the present invention said at least one host server establishes a connection to at least one information server or a multimedia server, or any other database server structure to exchange information between the host server and an information server, and to eventually convey the requested information, e.g. a web site requested, the video content called for etc. to the user.

According to an embodiment of the present invention, said multimedia server(s) may execute and deliver a produced multimedia file and/or a multimedia compression and/or a multimedia distribution, which has the advantage that the method of the present invention becomes more optimized.

According to a further embodiment of the present invention said pre-selected host server executes a host application, which has the advantage that a host server is optimally operated and which may be used for managing, controlling and monitoring a data network.

According to a further embodiment of the present invention said communication device executes a data communication with said home or office appliance over a secured Bluetooth or ZigBee XML-encrypted channel. This has the advantage that the method of the present invention becomes more secure.

According to a further embodiment of the present invention predefined public known keys are used. This has the advantage that the method of the present invention becomes more secure.

According to a further embodiment of the present invention, said predefined public known keys are defining functionalities and conditions of said home or office appliance. This has the advantage that the method of the present invention becomes more secure.

According to a further embodiment of the present invention, a communication between at least one mobile telephone or PDA with said communication device 10 is executed, so that a user may be informed even in case he is at location remote from the communication device 10. In this way said communication device 10 can inform said mobile telephone or its user about actions taken by the communication device itself, about information received/transmitted and about the status/actions of said home or office appliances or their surroundings. The user remote from the communication device 10 may be informed e.g. via SMS, e-mail or a voice mail. According to a further embodiment, an out of home or office communication between the mobile phone or the PDA may be executed trough data network system.

According to a further embodiment of the present invention, said communication device 10 executes at least one home or office content supply, support and/or backup management application. This has the advantage that the method of the present invention becomes more optimized.

According to a further embodiment of the present invention, said wireless communication device executes an application for content distribution and a communication of users, with the advantage that the method of the present invention becomes more optimized.

According to a further embodiment of the present invention, said wireless communication device receives information from a content application which comprises user-relevant information with the advantage that the method of the present invention becomes more optimized.

According to a further embodiment of the present invention, a user can access to a content application (30) via the internet, mobile or PDA. This has the advantage that a user can optimize said communication system.

According to a further embodiment of the present invention, said content application has a connection with predetermined archives, whereby said archives are in connection with at least one database system.

According to a further embodiment of the present invention, said at least one database system is in connection with a multimedia production and content support office. This has the advantage that the method of the present invention becomes more optimized and user-configurable.

According to a further embodiment of the present invention, additional content from outside the communication system can either be brought directly to said archives or via said multimedia production and content support office to said archives. This has the advantage that the method of the present invention becomes more optimized and user-configurable.

According to a further embodiment of the present invention, a user receives from an application for content on demand at least one interactive video; and/or at least one application for content live support; and/or at least one application for content access to individual user archives; and/or at least one application for content on demand pay-per-use activities; and/or at least one application for content on demand a 24/7-monitoring; and/or at least one application for content on demand an SMS-alarming; and/or at least one application for content on demand a usage control; and/or at least one application for content on demand energy savings. This has the advantage that the method of the present invention becomes more optimized.

According to a further embodiment of the present invention, said wireless communication device informs said user via data network to SMS and/or e-mail about predetermined events, like smoke, flood or gas in a predetermined surrounding area of said wireless communication device. This has the advantage that the method of the present invention becomes more optimized.

According to a further aspect of the present invention a data communication system is provided, comprising: at least one communication device 10; at least one transmitter box 20, which is in communication with said communication device 10; and at least one host server 30, which has a connection with said at least one wireless transmitter box 20, wherein said transmitter box 20 has an access to said at least one host server 30 only. According to an embodiment the communication between the physical entities may be wireless, such as by Bluetooth, ZigBee and/or WLAN.

This has the advantage that with said data communication a secure, cheap and optimized data communication, storage and backup is possible.

According to a further embodiment of the present invention, said communication system has a wireless communication from a wireless communication device to at least one home or office appliance via an interface, e.g. a Bluetooth- or ZigBee or WLAN-interface, which may be embodied in a plug-in type. This has the advantage that home or office appliances may easily be managed, controlled and monitored by a user without additional installation of cables and other electronic devices.

According to a further embodiment of the present invention, said communication system has a wireless communication from said wireless communication device to at least one home or office appliance via an implemented wireless module, wherein said wireless module is implemented in at least one home or office appliance. This has the advantage that home or office appliances can be easily be controlled and monitored by a user without additional installation of cables and other electronic devices.

According to a further embodiment of the present invention, said wireless transmitter box is connected without personal PC, which has the advantage that said communication system establishes an independent home or office network, becomes more secure, optimized and user-configurable.

According to a further embodiment of the present invention, said communication system can be connected to and be optimized by a personal PC. This has the advantage that the communication system of the present invention becomes more optimized.

According to a further embodiment of the present invention, said wireless transmitter box is connected with a broadband modem. This has the advantage that the communication system of the present invention becomes more optimized.

According to a further embodiment of the present invention, said wireless transmitter box can be connected between a broadband modem and a home or office PC. This has the advantage that the communication system of the present invention becomes more optimized.

According to a further embodiment of the present invention, said wireless transmitter box is connected with a router, which may guide the user to the next pre-selected host server 30, or a switch. This has the advantage that the communication system of the present invention becomes more optimized.

According to a further embodiment of the present invention, said wireless transmitter box has a broadband internet connection with at least one host server. This has the advantage that the communication system has access to host servers over a unique port secured access, what increases the transfer rate of data and increases the security of the data transfer between a user and said data network.

According to a further embodiment of the present invention, said connection is ISDN, DSL, cable or any other kind of broadband internet connection. This has the advantage that a higher data amount can be transferred over said broadband internet connection.

According to an embodiment, said wireless transmitter box has a unique port secured access. This has the advantage that said communication System becomes more secure.

Since the communication of said transmitter box with said at least one pre-selected host server 30 is a closed system, the system is secure and virus-bulletproof.

According to a further embodiment of the present invention, said wireless transmitter box comprises a firmware and/or a plug-and-play, which makes the system more user friendly, optimized and/or data is secured wirelessly transmitted. This has the advantage that said communication system becomes more secure.

According to a further embodiment of the present invention, said at least one host server comprises a host application. This has the advantage that said communication system becomes more optimized.

According to a further embodiment of the present invention, said at least one host server is in connection with a database server. This has the advantage that said communication system becomes more optimized and user-configurable.

According to a further embodiment of the present invention, said at least one host server has a connection with a video database. This has the advantage that said communication system becomes more optimized and user-configurable.

According to a further embodiment of the present invention, said database has a predetermined database structure. This has the advantage that said communication System becomes more optimized and user-configurable.

According to a further embodiment of the present invention, said database structure comprises customer information and home or office appliance authentication. This has the advantage that said communication system becomes more optimized and user-configurable.

According to a further embodiment of the present invention, said database structure comprises an optional outsourced local internet shopping implementation. This has the advantage that said communication system becomes more optimized and user-configurable.

According to a further embodiment of the present invention, said at least one host server is in connection with information servers. This has the advantage that said communication system becomes more optimized and user-configurable.

According to a further embodiment of the present invention, said at least one host server has a connection with multimedia servers. This has the advantage that said communication system becomes more optimized and user-configurable.

According to a further embodiment of the present invention, said information servers comprise a user communicating module. This has the advantage that said communication system becomes more optimized and user-configurable.

According to a further embodiment of the present invention, said information servers comprise an application of information on demand. This has the advantage that said communication system becomes more optimized and user-configurable.

According to a further embodiment of the present invention, said multimedia servers are used for video production and/or video compression and/or video distribution. This has the advantage that said communication system becomes more optimized and user-configurable.

According to a further embodiment of the present invention, said communication system comprises a content application. This has the advantage that said communication system becomes more user-configurable.

According to a further embodiment of the present invention, said content application comprises information about control, administration, cooking, health, fun, kids, communication and messaging, word processing program, table calculation, calendar, reminder, service-alarming and all other elements of home or office content supply, support and/or backup management application. This has the advantage that said communication system becomes more user-configurable.

According to a further embodiment of the present invention, a user has access to the content application over an internet connection, mobile or PDA. This has the advantage a user has access to said application and can modify own settings and suggest content.

According to a further embodiment of the present invention, said wireless communication device is in connection with a remote application which comprises services and firmware upgrades. This has the advantage that said communication system becomes more optimized and user-configurable.

According to an embodiment of the present invention, said application is based on any kind of platform and interfaces. This has the advantage that said device is user-configurable and optimized.

Advantages of the present invention will become apparent to the reader of the present invention when reading the detailed description referring to embodiments of the present invention, based on which the inventive concept is easily understandable.

Throughout the detailed description and the accompanying drawings same or similar components, units or devices will be referenced by same reference numerals for clarity purposes. The objects of the present invention are solved by the subject matter as defined in the claims.

BRIEF DESCRIPTION OF THE DRAWINGS

The accompanying drawings are included to provide a further understanding of the invention and are incorporated herein and constitute a part of this specification. The drawings illustrate embodiments of the present invention and together with the description serve to explain the principles of the invention.

FIG. 4 illustrates details of content application and Bluetooth and ZigBee connection of a wireless communication device with home or office appliances and mobile terminal devices.

DETAILED DESCRIPTION OF CERTAIN INVENTIVE EMBODIMENTS

Figure 1:
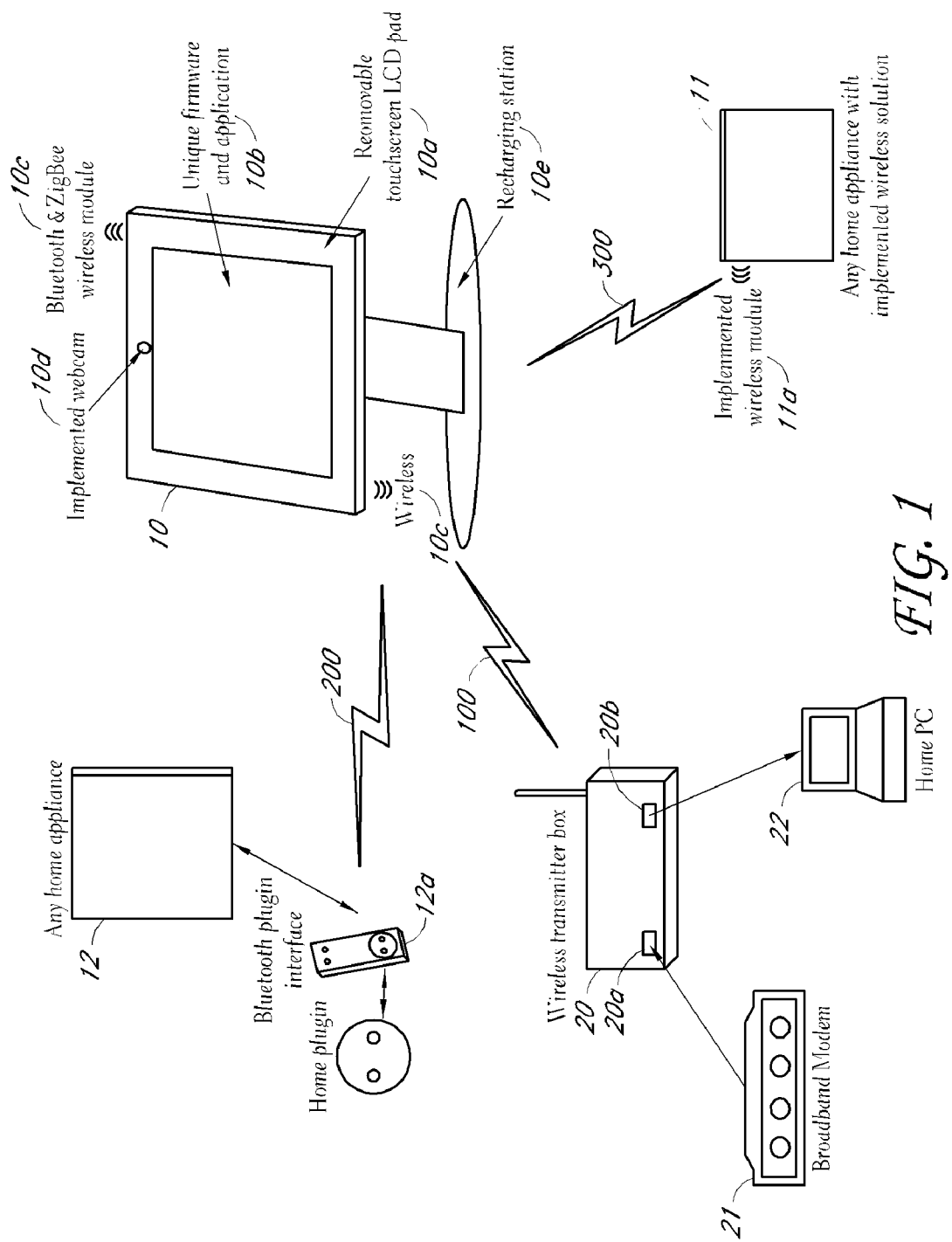
FIG. 1 illustrates an arrangement of a wireless communication device with different home or office appliances.

In one embodiment, the invention comprises a data communication method for operating a communication system 1000.

Thereby said communication system 1000 comprises at least one wireless communication device 10, at least one wireless transmitter box 20, at least one host server 30 and can comprise at least one Bluetooth plug-in interface 12a.

In a first step said wireless communication device 10 is receiving data from said host server 30 over said broadband internet connection 400. These data can be video data, image data, speech data, text data, numeric data or any kind of multimedia. At said broadband internet connection 400 said wireless transmitter box 20 has a unique port secured access to said host server 30 and is receiving data from said host server 30. Thereby said communication system 20 is a closed system and is virus bullet-proof By the usage of public known keys, which are provided by the provider of said server network, which comprises host servers 30, multimedia servers 50 and information servers 40, an encrypted communication between said wireless transmitting box 20 and said host server 30 is established over said broadband internet connection 400. Unique port secured access thereby means that at a data transfer a data packet is addressed to a unique port of said host server 30 and distributed with secured wireless connection to said wireless communication device 10.

In a second step said wireless communication device 10 is displaying said received data on a display 10a of said wireless communication device 10. So the user can see on said display 10a the received data, which can be text data, video data, image data, etc.

It is also conceivable that a user can transmit data and/or speech and/or video with said wireless communication device 10, in a third step, to said at least one host server 30. Thereby the user can configure a user-specific database server 60 with a certain database structure. Or said user can communicate by said communication system with other users via live streaming voice/video application. The user data are stored at the provider of said data network which is administrating said at least one host server and other servers, like information servers, multimedia servers (explained later in FIG. 2).

In FIG. 1 an arrangement of a wireless communication device 10 with different home or office appliances 11, 12 according to the present invention is illustrated.

Such a home or office appliances can be for example a computer, a home or office PC, a refrigerator, a furnace, a heating device, a TV-set, a radio-set, an audio set, fax-machine, printer, telephone, an alarm device, a washing device, a dishwasher, a microwave device, a freezer, a wireless terminal device, etc.

The wireless communication device 10 thereby comprises a display 10a, wherein said display can be a removable touchscreen LCD pad, which allows a user to input data and to see for example text, images or videos which are displayed by said display.

Further said wireless communication device 10 comprises a unique firmware and application 10b, which operates a communication system, and a Bluetooth and ZigBee wireless module, and a PCMCIA 802.11 g wireless connection. Further said wireless communication device 10 comprises an implemented webcam 10d, which allows to control and monitor a surrounding of said wireless communication device 10. Further this webcam may also be used for video memos and other functions like mobile streaming communication, like UMTS or 3G between a mobile terminal device 10f, like a mobile phone or a PDA, and said wireless communication device 10 through a data network. Thereby all operations are executed at the side of the provider of said data network and the user does not need an extra gateway.

Additionally, said wireless communication device 10 comprises a power supply (not shown) and a recharging station 10e to power said wireless communication device 10. Further said wireless communication device 10 can be provided with an additional battery so as to supply said wireless communication device 10 with power in case of power outage.

Figure 2:
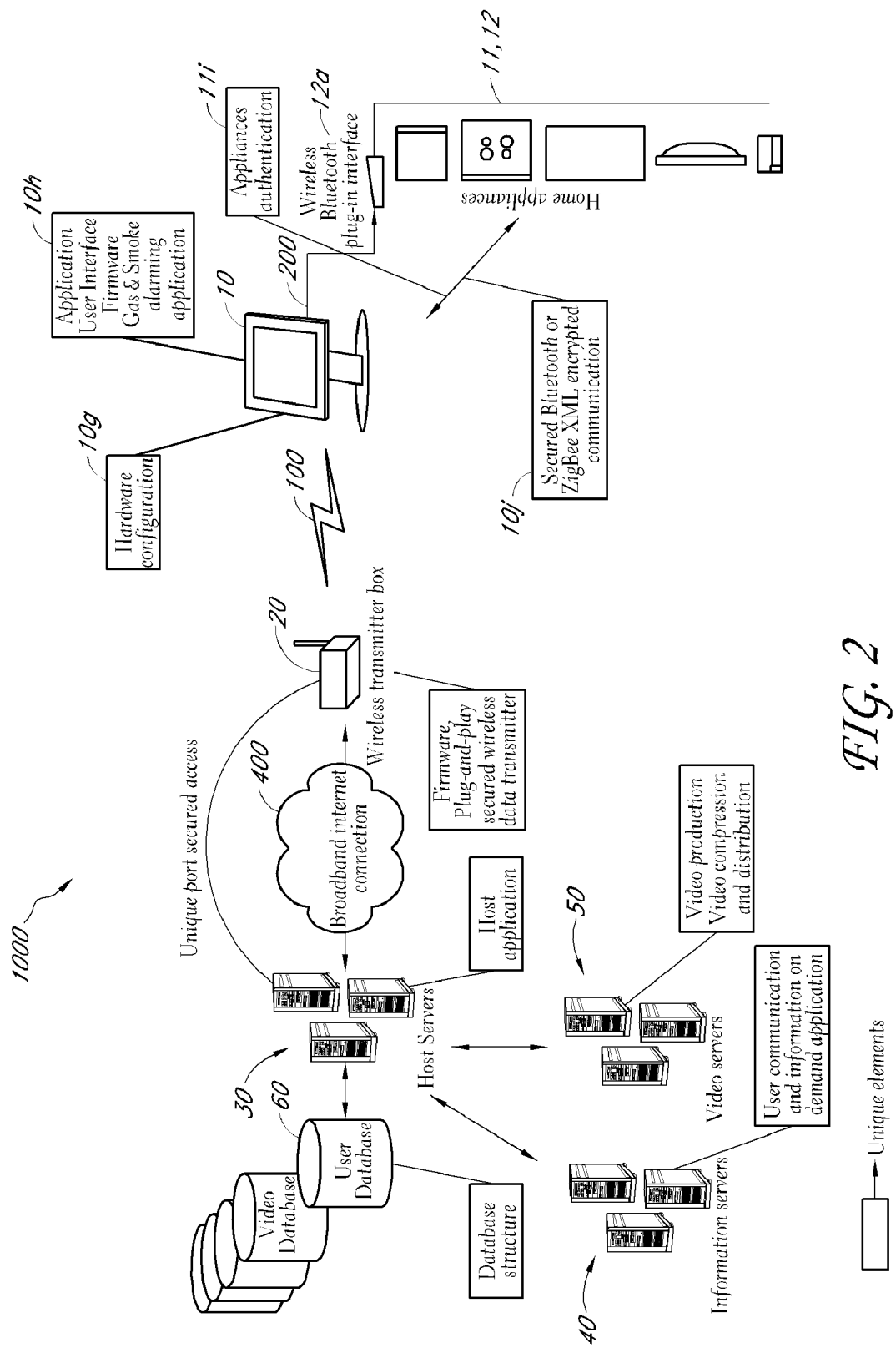
FIG. 2 illustrates an arrangement of a wireless communication device which has a wireless communication with different home or office appliances which has a broadband internet connection to a data network.

In the shown communication system said wireless communication device 10 has a wireless communication 100 to a wireless transmitter box 20, which is connected independent to other home or office connections comprises communication ports 20a, 20b, wherein a broadband modem 21 and a home or office PC 22 is connected with said communication ports 20a, 20b of said wireless transmitter box 20. In a further step (as shown in FIG. 2) said wireless transmitter box 20 is building up by means of said broadband modem 21 a broadband internet connection 400 to at least one host server 30 of a data network. Said data network is administrated by a predetermined network provider.

Further, the shown communication system 1000 with said wireless communication device 10 has a wireless communication 200 to a home or office appliance 12, as mentioned above, wherein said home or office appliance does not have an implemented module, which is already implemented by a producer of said home or office appliance. Therefore, a specific Bluetooth plug-in interface 12a is connected with said home or office appliance such as to provide a wireless communication 200 between said home or office appliance 12 and said) wireless communication device 10. The wireless communication between said wireless communication device 10 and said home or office appliance 12 allows a controlling and monitoring of conditions of said home or office appliance 12 by said wireless communication device 10.

It is also possible that said wireless communication device 10 has a wireless communication 300 to a home or office appliance 11, which has already an implemented wireless module 11a. Thereby the implemented wireless module 11a is already implemented of a producer of such a home or office appliance. The wireless communication between said wireless communication device 10 and said home or office appliance 11 allows a controlling and monitoring of conditions of said home or office appliance 11 by said wireless communication device 10.

Further is noted that said Bluetooth plug-in interface is plugged into a home plug-in. Said Bluetooth plug-in interface is further equipped with a battery such that a communication between said Bluetooth plug-in interface is secured in case of power outage.

In FIG. 2 an arrangement of a wireless communication device 10 is illustrated, wherein said wireless communication device 10 has a wireless communication with different home or office appliances and whereby said wireless communication device 10 has a broadband internet connection 400 to a data network through transmitter box 20.

Thereby, said wireless communication device 10 has a wireless connection 802.11g built in so in case of any kind of local wireless internet provider (800) is present in the area device 10 can establish connection to data network independently of ground connections.

Thereby, said wireless communication device 10 has a wireless communication by means of a wireless Bluetooth plug-in interface 12a with home or office appliances 11 and 12. The wireless communication device 10 has a certain hardware configuration 10g, which allows an optimized operation of said communication system. Further comprises said wireless communication device 10 a specific application, a user interface, firmware and an application for alarming gas and/or water and/or smoke 10h in a surrounding of said wireless communication device 10.

Further said wireless communication device 10 executes over said wireless communication 200 an authentication 11i of said home or office appliances 11, 12, wherein said wireless communication can be a secured Bluetooth or ZigBee XML encrypted communication 10j, such that the communication system will become more secure and optimized.

The wireless communication device 10 has a wireless communication to said wireless transmitter box 20, which is building up a broadband internet connection 400 with at least one host server of a data network. Thereby the minimum transmission rate for said broadband internet connection 400 is higher than 1 Mbps (megabit per second).

Further it is stated that said wireless transmitter box 20 has over said broadband Internet connection 400 a unique port secured access to said host server 30. Thereby said communication system is a closed system and is virus bullet-proof. By the usage of public known keys, which are provided by the provider of said server network, which comprises host servers 30, multimedia servers 50 and information servers 40, an encrypted communication between said wireless transmitting box 20 and said host server 30 is established over said broadband internet connection 400. Unique port secured access thereby means that at a data transfer a data packet is addressed to a unique port of said host server and to said wireless communication device 10.

To build up said broadband internet connection 400 said wireless transmitter box 20 is connected to a broadband modem 21. Said wireless transmitter box 20 is equipped with a specific firmware, plug-and-play and a secured wireless data transmitter.

Further in FIG. 2 is shown that said pre-selected host server 30 has a connection to any kind of different databases 60, like a user database or a multimedia database, wherein said databases have a certain database structure. In these databases 60 different user-specific data, like user archives, are saved.

Said host server 30 is also connected with information servers 40, which execute a user communication and an application of information on demand and transfer data to said host servers 30.

Said pre-selected host server 30 is also connected with multimedia servers 50, which execute video production, video compression and distribution and transfer said executed data to said host server.

Over said broadband internet connection 400 said at least one host server 30 transfers data to said wireless transmitter box 20 from where by means of a wireless communication 100 said data are transferred to said wireless communication device 10 where said data are displayed on said display 10a.

Figure 3:
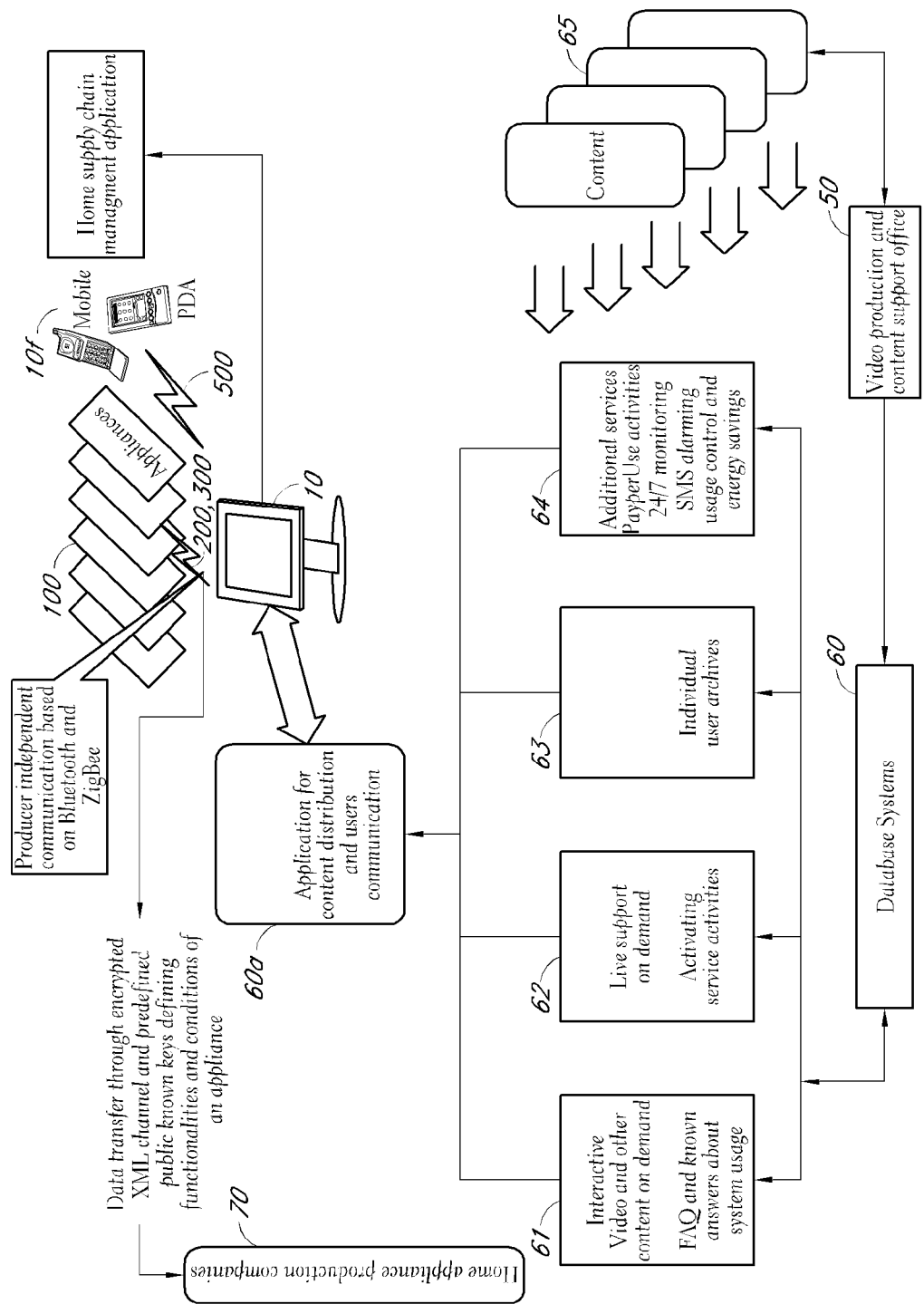
FIG. 3 illustrates details of content distribution and communication of users.

In FIG. 3 details of said application for content distribution and communication of users 60a are illustrated. Thereby said application for content distribution and communication of users receives data from e.g. an interactive multimedia and other content on demand 61, from e.g. a live support on demand 62, from e.g. individual user archives 63 or additional services 64, whereby the content 65 of said applications 61, 62, 63 and 64 is input either directly or via a multimedia production and content support office 50 and database systems 60 as described above.

Said interactive video and other content on demand 61 includes frequently asked questions (F.A.Q.s) and known answers concerning the usage of the communication system 1000 or said wireless communication device 10 and helps the user with an easier operation of the communication system 1000 or his/her wireless communication device 10.

In the live support on demand 62 the user receives information in case of emergency 20 (accident, etc.) from the communication system over said wireless communication system. The user thereby can activate service activities.

In individual user archives 63 a user can receive user-configurable information, in which the user is especially interested.

Additional services 64 include e.g. so-called pay-per-use activities, a 24/7 monitoring of the surrounding of the wireless communication device 10 and the appliances which are connected with said wireless communication device 10, as well as an SMS alarming, which sends an SMS or email to a mobile phone or other mobile terminal device, like a PDA, of the user. Further said additional services 64 include a usage control of said communication system and energy savings, which makes home or office appliances running more economically concerning its consumption of electricity for example.

These applications 61, 62, 63 and 64 are connected with database systems 60, where said user-specific settings are saved and where they can also be changed by a user via said unique port secured access, described above, over said broadband internet connection, or via a direct access by internet, or by telephone-calling to the provider of said data network, etc.

Said application for content distribution and communication of users 60a said database system is connected to a multimedia production and content support and or backup office 50, which helps to optimize said communication system and makes it more user-configurable.

From FIG. 3 may be seen that said wireless communication device 10 has a mobile connection 500 to a mobile terminal device, such as a mobile phone or a PDA (Personal Digital Assistant) 10f. This mobile connection 500 allows said wireless communication device 10 to communicate with said mobile terminal device in case a user is at a far distance away from said wireless communication device 10 through data network. Then the communication system informs either said user about controlling and monitoring states of appliances which are in wireless communication with said wireless communication device 10 or of the state (gas, water, smoke) of a predetermined surrounding of said wireless communication device 10. On the other side said user has also the possibility to change manage, control and/or monitoring states of said wireless communication device 10. Further the user has the possibility to achieve by means of said wireless communication device 10 further data and information of said data network. Further the user has possibility to access his favourites of the system and use them as benefit out of the home or office (shopping list, recipes, etc.).

Further from FIG. 3 may be seen that a producer independent wireless communication 200, 300 between said wireless communication device 10 and different appliances (11, 12: FIG. 2) is established. This wireless communication is established by a Bluetooth or ZigBee communication. By said producer independent wireless communication 200, 300 between said wireless communication device 10 and different appliances (11, 12; FIG. 2) new updates of a producer of said home or office appliances are provided and the user is receiving user-relevant data and information for his/her appliances which are up-to-date.

The wireless communication device 10 is further supported by additional home or office appliances production companies 70, which transfer data through an encrypted XML-channel with predefined public known keys which are defining functionalities and conditions of an appliance. By means of said transfer of data concerning the home or office appliances said communication can be more optimized and is more user-configurable.

Said wireless communication device 10 executes a so-called home or office content supply, support and/or backup management application. This allows dial the communication system of the present invention becomes more comfortable in use for the user and more optimized.

In FIG. 4 details of said content application database are illustrated, which may for example comprise topics like control and administration, cooking, health, fun, kids, communication and messaging, calendar/reminder and service and alarming.

Concerning control and administration there can be understood for example an authentication of the appliances, information about the communication system and the condition of appliances, energy and saving functions and controlling and administration of remote appliances and a pre-programming of said remote appliances.

In the database concerning the field of cooking can be saved cooking recipes, video recipes, synchronised video 1:1 cooking, diet menus or family shopping list, wherein a SMS-export of such recipes and lists is possible.

It is conceivable that in the database concerning the field of health there can be saved information about the influence of food on health, natural antibiotics, family allergy memo with a warning, first aid advices for a handy, message advices, Information concerning aerobics and rehearsals.

It is further conceivable that in the database concerning the field of fun can be saved mp3-files, TV files, information about local or internet radio, movies on demand, a library about the favourites of a user.

Further in the database concerning the field of kids there can be saved information concerning before and alter birth advices, a best practice database, a baby monitoring and alarming, education games.

It is further noted that in the database concerning the field of communication and messaging there can be saved video chat communication, live video/streaming communication, video and text memos, VOIP-solution, information about a live 24/7 video usage help center.

Further in the database concerning the field of calendar/reminder there can be saved a family and user events calendar, an alarm clock, an event reminder, a local weather forecast, which is based on an IP-location (internet protocol).

Finally, in a database concerning service and alarming can be saved video user manuals for appliances, a SMS-user-alarming or an optional official service email request.

Further in the database concerning the field of home or office and surroundings there can be saved a multimedia about in-house help, gardening, doctors on demand, etc.

In FIG. 4 it is also shown that a user may have a so-called www-access 60b over the Internet to said application 60a. That means that a user can modify and administrate his personal user-configurable settings and data. He can for example input his localization or the system automatically recognises the localisation of said user via his/her IP location, mobile terminal device 10f or via said wireless communication device 10.

The user may thereby receive information about doctors on demand, in-house help video, gardening videos, office support, online shopping implementation an outsourced appliances producers help-centers connectivity, etc.

In FIG. 4 the section concerning content application 60a and www-user access 60b is also a so called home or office with virtual support and backup 2000.

From FIG. 4 may also be taken that said wireless communication device 10 receives remote application services and firmware upgrades 80 also from said provider of said data network.

Finally as becomes evident from FIG. 4 said wireless communication device 10 can be equipped with a smoke- and/or gas- and/or water sensor 13 or panic button 14. Upon pressing said panic button 14 a connection to the police, the fire department or ambulance can be established trough data network by said communication system of the present invention.

Further is in case of an emergency event like gas, water, smoke in the surrounding of said wireless communication device a mobile phone or PDA or any other mobile terminal device of a user can receive a SMS or an email through data network about the occurrence of said emergency event and thereby alarm the user of said wireless communication device.

It is obvious for those skilled in the art that as the technology advances, the inventive concept can be implemented in a broad number of ways. The invention and its embodiments are thus not limited to the examples and specific embodiments described above but may vary within the scope of the claims.

What is claimed is:

1. A data communication method for operating a communication system, the method comprising:
   (i) establishing communication between a communication device and a transmitter box;
   (ii) establishing a connection via broad band internet between said transmitter box and a pre-selected host server, wherein said transmitter box has an access to said pre-selected host server only and establishes a unique port secured access thereto, and wherein predefined public known keys are used between said broadband internet connection with a unique port secured access, and wherein said predefined public known keys are defining functionalities and conditions of said home or office appliance;
   (iii) receiving data from said pre-selected host server at said communication device; and (iv) displaying said received data on a display of said communication device.

2. The data communication method according to claim 1, wherein said communication device is establishing a wireless communication with said transmitter box.

3. The data communication method according to claim 2, wherein said wireless communication device executes a data communication with said home or office appliance over a secured Bluetooth or ZigBee XML-encrypted channel.

4. The data communication method according to claim 2, wherein a communication between a wireless phone or a PDA (Personal Digital Assistant) with said wireless communication device is executed.

5. The data communication method according to claim 4, wherein said communication is executed through data network.

6. The data communication method according to claim 2, wherein said wireless communication device informs said user via SMS and/or e-mail about user-configurable events in a predetermined surrounding area of said wireless communication device.

7. The data communication method according to claim 1, wherein the communication device is establishing a communication with a home or office appliance.

8. The data communication method according to claim 7, wherein the communication is a wireless communication.

9. The data communication method according to claim 8, wherein the wireless communication is effected via Bluetooth or ZigBee.

10. The data communication method according to claim 7, wherein said communication device executes an authentication of said home or office appliances.

11. The data communication method according to claim 1, wherein said communication device is transmitting data to the host server.

12. The data communication method according to claim 11, wherein said data is video data.

13. The data communication method according to claim 11, wherein said data is image data.

14. The data communication method according to claim 11, wherein said data is speech data.

15. The data communication method according to claim 11, wherein said data is text data.

16. The data communication method according to claim 1, wherein said broadband internet connection is established via a WLAN or LAN.

17. The data communication method according to claim 1, wherein said broadband internet connection is established via a modem.

18. The data communication method according to claim 1, wherein a user is inputting data over a touch-screen LCD pad on said communication device.

19. The data communication method according to claim 1, wherein said at least one host server establishes a connection to at least one information server.

20. The data communication method according to claim 19, wherein the at least one information server executes a user communication.

21. The data communication method according to claim 20, wherein said at least one information server executes an application of information on demand.

22. The data communication method according to claim 1, wherein said at least one host server establishes a connection to at least one multimedia server.

23. The data communication method according to claim 22, wherein said multimedia servers execute a multimedia production and/or a multimedia compression and/or a multimedia distribution.

24. The data communication method according to claim 1, wherein said at least one host server establishes a connection to at least one database server.

25. The data communication method according to claim 1, wherein said at least one host server executes a host application.

26. The data communication method according to claim 1, wherein said at least one host server establishes a connection with at least one multimedia database.

27. The data communication method according to claim 1, wherein a home or office appliance authentication according to a database structure of a database is executed.

28. The data communication method according to claim 1, wherein said communication device executes at least one home or office content supply, support and/or backup management application.

29. The data communication method according to claim 1, wherein said communication device executes an application for content distribution, communication of users and a user input interface.

30. The data communication method according to claim 1, wherein said communication device receives information from a content application which comprises user relevant information.

31. The data communication method according to claim 30, wherein a user can access a content application via the internet.

32. The data communication method according to claim 31, wherein the user can access the content application using a mobile phone.

33. The data communication method according to claim 31, wherein said content application has a connection with predetermined archives, whereby said archives are in connection with servers and database systems.

34. The data communication method according to claim 33, wherein said at least one database system is in connection with a video production and content support office.

35. The data communication method according to claim 33, wherein additional content from outside the communication system can be brought directly to said archives by users sharing information modules, or directly through content or via said video production and content support office to said archives.

36. The data communication method according to claim 33, wherein a user receives from an application for content on demand, at least one of: an interactive multimedia, an application for content live support, an application for content access to individual user archives, an application for content on demand pay-per-use activities, an application for content on demand a 24/7-monitoring, an application for content on demand an SMS-alarming, an application for content on demand a usage control, an application for smoke and gas detection, and an application for content on demand energy savings.

37. A data communication method for operating a communication system, the method comprising:
(i) establishing communication between a communication device and a transmitter box;
(ii) establishing a connection between said transmitter box and a pre-selected host server, wherein said transmitter box has an access to said pre-selected host server only and establishes a unique port secured access thereto;

(iii) receiving data from said pre-selected host server at said communication device;
(iv) displaying said received data on a display of said communication device; and
(v) executing a home or office appliance authentication according to a database structure of a database.

38. The data communication method according to claim 37, wherein said communication device is establishing a wireless communication with said transmitter box.

39. The data communication method according to claim 38, wherein said wireless communication device executes a data communication with said home or office appliance over a secured Bluetooth or ZigBee XML-encrypted channel.

40. The data communication method according to claim 38, wherein a communication between a wireless phone or a PDA (Personal Digital Assistant) with said wireless communication device is executed.

41. The data communication method according to claim 40, wherein said communication is executed through data network.

42. The data communication method according to claim 38, wherein said wireless communication device executes an application for content distribution, communication of users and a user input interface.

43. The data communication method according to claim 38, wherein said wireless communication device informs said user via SMS and/or e-mail about user-configurable events in a predetermined surrounding area of said wireless communication device.

44. The data communication method according to claim 37, wherein the communication device is establishing a communication with a home or office appliance.

45. The data communication method according to claim 44, wherein the communication is a wireless communication.

46. The data communication method according to claim 45, wherein the wireless communication is effected via Bluetooth or ZigBee.

47. The data communication method according to claim 44, wherein said communication device executes an authentication of said home or office appliances.

48. The data communication method according to claim 37, wherein the connection between said transmitter box and said pre-selected host server is via broad band internet.

49. The data communication method according to claim 48, wherein said broadband internet connection is established via a WLAN or LAN.

50. The data communication method according to claim 48, wherein said broadband internet connection is established via a modem.

51. The data communication method according to claim 48, wherein predefined public known keys are used between said broad band internet connection with a unique port secured access.

52. The data communication method according to claim 37, wherein said communication device is transmitting data to the host server.

53. The data communication method according to claim 52, wherein said data is video data.

54. The data communication method according to claim 52, wherein said data is image data.

55. The data communication method according to claim 52, wherein said data is speech data.

56. The data communication method according to claim 52, wherein said data is text data.

57. The data communication method according to claim 37, wherein a user is inputting data over a touch-screen LCD pad on said communication device.

58. The data communication method according to claim 37, wherein said at least one host server establishes a connection to at least one information server.

59. The data communication method according to claim 58, wherein the at least one information server executes a user communication.

60. The data communication method according to claim 59, wherein said at least one information server executes an application of information on demand.

61. The data communication method according to claim 37, wherein said at least one host server establishes a connection to at least one multimedia server.

62. The data communication method according to claim 61, wherein said multimedia servers execute at least one of the following: a multimedia production, a multimedia compression, and a multimedia distribution.

63. The data communication method according to claim 37, wherein said at least one host server establishes a connection to at least one database server.

64. The data communication method according to claim 37, wherein said at least one host server executes a host application.

65. The data communication method according to claim 37, wherein said at least one host server establishes a connection with at least one multimedia database.

66. The data communication method according to claim 37, wherein said communication device executes at least one home or office content supply, support and/or backup management application.

67. The data communication method according to claim 37, wherein said communication device receives information from a content application which comprises user-relevant information.

68. The data communication method according to claim 67, wherein a user can access a content application via the internet.

69. The data communication method according to claim 68, wherein the user can access the content application using a mobile phone.

70. The data communication method according to claim 68, wherein said content application has a connection with predetermined archives, whereby said archives are in connection with servers and database systems.

71. The data communication method according to claim 70, wherein said at least one database system is in connection with a video production and content support office.

72. The data communication method according to claim 70, wherein additional content from outside the communication system can be brought directly to said archives by users sharing information modules, or directly through content or via said video production and content support office to said archives.

73. The data communication method according to claim 70, wherein a user receives from an application for content on demand, at least one of: an interactive multimedia, an application for content live support, an application for content access to individual user archives, an application for content on demand pay-per-use activities, an application for content on demand a 24/7-monitoring, an application for content on demand an SMS-alarming, an application for content on demand a usage control, an application for smoke and gas detection, and an application for content on demand energy savings.

74. A data communication method for operating a communication system, the method comprising:
(i) establishing communication between a communication device and a transmitter box;

(ii) establishing a connection between said transmitter box and a pre-selected host server, wherein said transmitter box has an access to said pre-selected host server only and establishes a unique port secured access thereto;

(iii) receiving data from said pre-selected host server at said communication device; and (iv) displaying said received data on a display of said communication device, wherein said communication device receives information from a content application which comprises user relevant information, wherein a user can access a content application via the internet, wherein said content application has a connection with predetermined archives, whereby said archives are in connection with at least one server and at least one database system, and wherein additional content from outside the communication system can be brought to said archives using a method selected from: directly by users sharing information modules, directly through content, and via a video production and content support office.

* * * * *